United States Patent [19]

Jung

[11] Patent Number: 4,899,708
[45] Date of Patent: Feb. 13, 1990

[54] VACUUM-GENERATING DEVICE

[75] Inventor: Christoph Jung, Hattersheim/Main, Fed. Rep. of Germany

[73] Assignee: Alfred Teves GmbH, Frankfurt am Main, Fed. Rep. of Germany

[21] Appl. No.: 265,987

[22] Filed: Nov. 2, 1988

[30] Foreign Application Priority Data

Nov. 25, 1987 [DE] Fed. Rep. of Germany ....... 3739913

[51] Int. Cl.$^4$ .......................... F02M 11/00; B60T 8/44
[52] U.S. Cl. ...................................... 123/331; 303/100
[58] Field of Search ............... 123/330, 332, 331, 326; 188/356, 151 R; 303/412, 93, 100

[56] References Cited

U.S. PATENT DOCUMENTS

| | | | |
|---|---|---|---|
| 3,756,208 | 4/1973 | Toder et al. .......................... | 123/331 |
| 3,763,974 | 10/1973 | Neal .................................... | 188/356 |
| 3,782,346 | 1/1974 | Tatsutomi et al. ................... | 123/332 |
| 3,792,761 | 2/1974 | Ball et al. ............................. | 192/3 |
| 4,103,652 | 8/1978 | Garside et al. ...................... | 123/332 |
| 4,708,401 | 11/1987 | Klein ................................... | 188/356 |
| 4,738,112 | 4/1988 | Nomura et al. ...................... | 303/12 |
| 4,778,225 | 10/1988 | Rudolph et al. ..................... | 303/100 |

Primary Examiner—Raymond A. Nelli
Attorney, Agent, or Firm—Robert P. Seitter

[57] ABSTRACT

A vacuum system for use in a vehicle having a brake system including a vacuum servomotor assisted master cylinder is disclosed wherein the vacuum system includes the engine intake pipe connected to the vacuum servomotor and a fuel enrichment device for enrichening the air drawn from the vacuum servomotor during slip control braking. The enrichment device includes the choke of a conventional carburetor and a servomotor for closing the choke during brake slip control. Alternatively fuel is injected into the air intake of the engine during brake slip control.

5 Claims, 1 Drawing Sheet

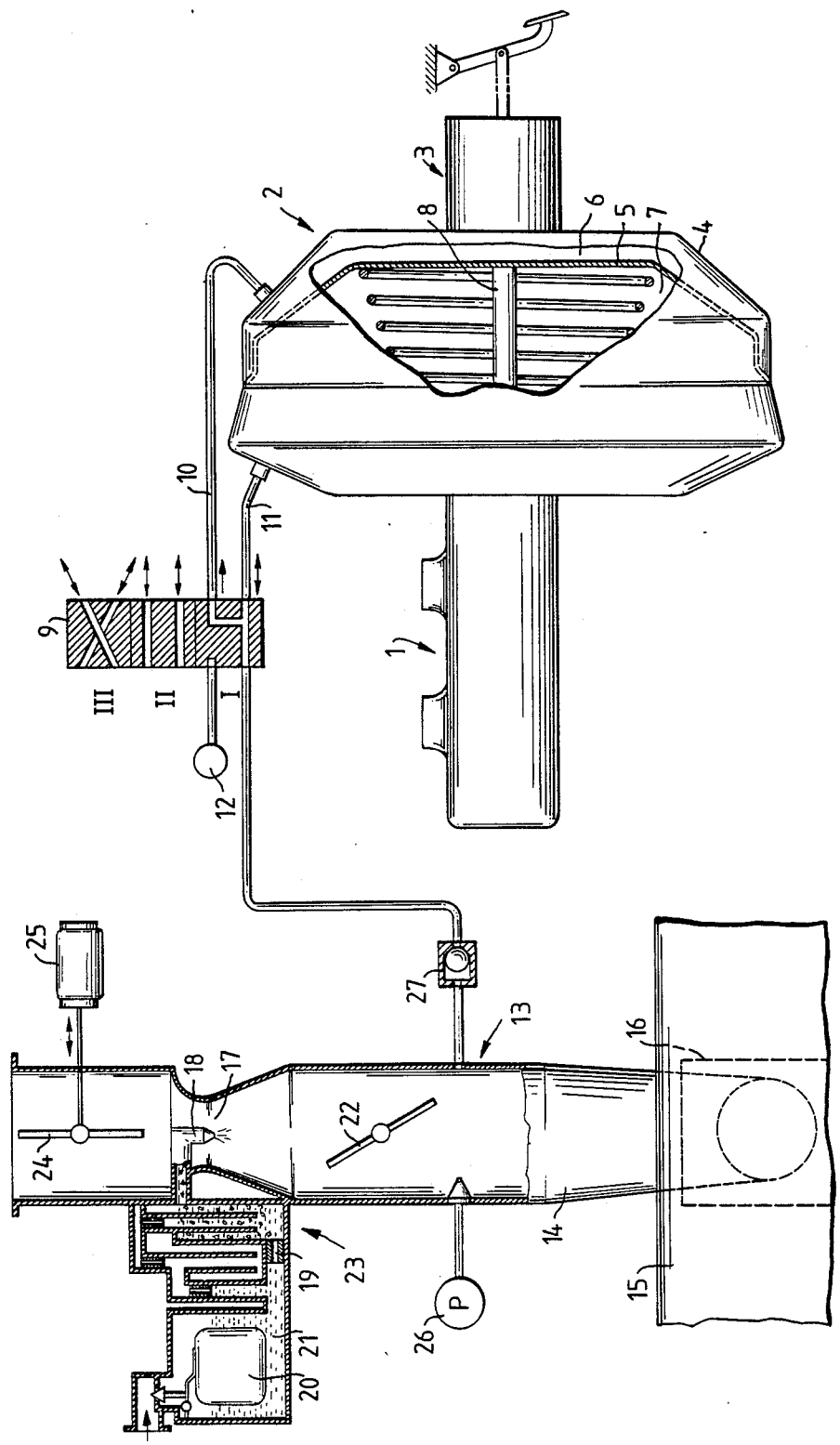

VACUUM-GENERATING DEVICE

BACKGROUND OF THE INVENTION

This invention relates to a device for generating a vacuum, and in particular for an automotive vehicle brake system with brake slip control, including a chamber of variable volume communicating with at least one wheel brake for the purpose of slip-dependent pressure control in the wheel brake cylinders and with the change in volume being effected by means of a vacuum servomotor consisting mainly of the intake manifold of a combustion engine and a carburetor with a throttle valve.

In automotive engineering there exists a wide range of devices the energy source of which is the vacuum in the intake manifold of the combustion engine. A prominent example are the known vacuum brake boosters.

Further, there are known brake slip control devices based on the so-called plunger system. In such systems the wheel brakes communicate with a chamber of variable volume in case of brake slip control. Such a chamber is achieved by means of a piston-and-cylinder arrangement where the piston is retracted out of the cylinder for the purpose of pressure reduction and an increased volume is made available to the pressure medium in the wheel brake. This automatically results in a pressure reduction. For the purpose of renewing pressure build-up, the piston is moved back into the cylinder. It is known in the art to actuate the piston of such a system by means of a vacuum servomotor. The piston then communicates with a movable wall of a servomotor by way of a push rod and the wall divides a housing into a first and a second chamber. Depending on which chamber is communicating with the atmosphere and which chamber has communication with a vacuum source, there will be a pressurization of the wall and, hence, of the piston so as to effect an increase or reduction in the cylinder volume.

Depending on certain external conditions, such as the friction value between the road surface and tires or speed of the vehicle, several control cycles can take place rapidly. In each of these control cycles, the chamber just ventilated must be re-evacuated that is, the vacuum source has to remove a considerable volume air from the servomotor during control.

In such brake systems it is typical to draw the vacuum from the intake manifold of the combustion engine. One shortcoming of such systems is that, in terms of optimum mixture control, the air taken from the servomotor affects the air-fuel mixture control of the engine and in some instances can even lead to the engine dying.

SUMMARY OF THE INVENTION

It is thus an object of the present invention to provide means enabling the engine to stay in operation despite the air stream taken in from the servomotor.

This object is achieved in that the air taken in from the servomotor is enriched with fuel. To accomplish this, two possibilities are available.

On the one hand, there may be an injection of fuel into the air taken in.

On the other hand, it is also possible to provide a second throttle valve arranged in the air intake area of the carburetor.

It will be advantageous to use the choke, already provided in many vehicles, for this purpose.

Since less air is taken in a highly enriched mixture will form in the carburetor. The extremely rich mixture will enter the intake pipe to the engine, where it is mixed with the air taken in from the servomotor so that a normal-value mixture will form again.

Accordingly, the engine will continue running during the braking action so that the vacuum necessary for brake slip control will be made available. A particularly critical situation will arise when the driving wheels are decoupled from the engine (e.g., during free running). In such situations, coasting is impossible. Therefore, enrichment is effected only during free running of the driving wheels. This condition can be ascertained by evaluating the rotational behavior of the wheels such as the lack of driving torque.

In the German Published Patent Application (DE-OS) No. P 28 14 384 there is disclosed the possibility of utilizing the inherent characteristics of the choke as a vacuum generating means. The inventor in this Application was faced with the problem of providing a sufficient vacuum for the brake booster at the beginning of a braking action. The vacuum was effected by closing the choke upon release of the accelerator pedal so that the engine sucks the air off from the brake booster in the period needed by the driver to shift his foot from the accelerator pedal to the brake pedal. The invention of this Published Patent Application thus ensures that, in any case, a sufficient vacuum will be provided before the braking action, irrespective of whether or not there already was an operating condition ensuring a sufficient vacuum in the brake booster.

By means of the present invention it becomes apparent that, by closing the choke, another problem is also solved in a surprisingly simple manner - namely the problem that in case of slip control in accordance with the above-mentioned principle stalling of the engine is more likely.

BRIEF DESCRIPTION OF THE DRAWING

The invention will be better understood after reading the following Detailed Description of a Preferred Embodiment with reference to the Drawing which is a partial cross sectional and schematic representation of a brake system incorporating the vacuum generating device according to the invention.

DETAILED DESCRIPTION OF A PREFERRED EMBODIMENT

The brake system is characterized by the reference numerals 1 through 12, including a master brake cylinder 1 shown with a brake booster 2 connected upstream. Associated with the brake booster 2 is a braking pressure control valve 3 actuated by a schematically outlined brake pedal. The brake booster 2 comprises a housing 4 wherein a movable wall 5 is arranged. The wall divides the housing 4 into a first chamber 6 and a second chamber 7.

The movable wall communicates with the master brake cylinder by means of a push rod 8 and is held in the right-hand, as viewed in the drawing, initial position by means of a return spring.

The actuation of the brake booster 2 is controlled by the valve 9 which schematically illustrates the mode of operation.

The control valve 9 contains three operating positions I, II and III which in part are actually taken over by the braking pressure control valve 3.

The chambers 6 and 7 communicate with the control valve 9 through lines 10 and 11. The control valve 9 establishes the communication of the lines 10 and 11 with the atmosphere, or an air pressure 12 proportional to the foot pressure, and with the vacuum source 13. The vacuum source 13 will be described further below. For the time being, description of the special design of the vacuum source is not necessary for the description of the brake system.

In the brake's release position, all parts are in the illustrated positions, the control valve being in operating position I. This means that both the first and second chambers 6, 7 are communicating with the vacuum source. When the pedal is depressed the valve 9 will switch into position II, the second chamber 7 continuing to communicate with the vacuum source 13. The first chamber 6, however, will be acted upon by an air pressure proportional to the foot pressure. The pressure difference at the wall 5 will cause the wall to be moved leftwards, as viewed in the drawing, the movement being transmitted to the master brake cylinder by means of the push rod 8. In the master brake cylinder 1 a pressure is built up which is supplied to the wheel brakes by way of non-illustrated brake lines.

Electronics, also not represented in the drawing, detect any lock-up threat in any one of the wheels and the wheel brakes of the wheels not threatened by a lock-up will be separated hydraulically from the master brake cylinder. Now, the valve 9 will be switched into position III so that the second chamber 7, having communicated with the vacuum source will be acted upon by the atmosphere or alternatively by a controlled pressure. Conversely, the first chamber 6 will become connected with the vacuum source 13 and the air present in the chamber will be drawn off. The movable wall now will be acted upon by a differential pressure which will have the effect that the master brake cylinder 1 no longer will be force-applied. The master brake cylinder pressure is thus reduced. The reduced master brake cylinder pressure also will become effective in the wheel brake of the still connected wheel threatened by a lock-up. Thus, the wheel will be pressure-relieved and reaccelerate. As soon as there has been sufficient reacceleration of the wheel, the valve 9 will be switched over into operating position II. Renewed pressurization of the master brake cylinder will take place.

In the embodiment shown, the master brake cylinder acts as a plunger cylinder. Those skilled in the art, however, can devise other designs where a separate plunger cylinder is provided. The present invention can be applied in all such designs.

It is of importance that in any control circle air will have to be drawn off from a ventilated chamber and will enter the vacuum source.

The vacuum source 13 comprises an intake pipe 14 to the engine 15, 16 which in the drawing is outlined by an engine block 15 and a cylinder bore 16. The intake pipe 14 is followed by a carburetor 23 mainly comprising a throttle valve 22 and an atomizer jet 18 in the pipe's contraction or venturi 17. Fuel supply to the atomizer jet 18 mainly takes place by way of a main jet 19 arranged in a fuel bowl. The supply of fuel 21 to the fuel bowl is controlled by the float 20. The representation of the carburetor will not be explained in more detail since numerous versions are well known. What is important is that the fuel emerges out of the atomizer jet 18 in correspondence with the rate of air flow. The rate of air flow can be controlled by the position of the throttle valve 22.

In the intake pipe of the carburetor there is a choke 24 actuated by a servomotor 25. However, it is also possible to provide a fuel injection system 26 instead of the choke.

The vacuum system operates as follows:

Upon actuation of the brake, the throttle valve will come into its closed position since the accelerator pedal will be released for the purpose of braking.

Should there arise the necessity of brake slip control during braking, as described, a considerable air stream will enter the intake pipe 14 by way of the non-return valve 27. The idle mixture provided by the carburetor now will be mixed with the air taken in, the mixture becoming poor. This could possibly result in stalling of the engine because of the non-optimal mixture and, hence, in the impossibility of a vacuum being formed.

There exist two alternatives in order to prevent this. On the one hand, it is possible to close the choke 24 by means of the servomotor 25 at the beginning of brake slip control.

In that case, there will be a very rich mixture in the area of the venturi pipe 17, which mixture will become mixed with the air from the servomotor so that the enrichment percentages will become normal.

The other possibility consists in enriching the excessively poor mixture by additional injection of fuel, thus bringing the mixture to the normal range.

Thus, in brake systems where the engine sucks off large air masses from the servomotor, by virtue of the invention it is possible to achieve the object of influencing the fuel air mixture during brake slip control so that—despite the additional air supply - normal values will be maintained.

What is claimed is:

1. A device for generating a vacuum for an automotive vehicle brake system of the type having slip control including a master cylinder connected to at least one wheel brake cylinder and a vacuum servomotor operatively connected to said master cylinder comprising:
    an air intake pipe to an internal combustion engine of the vehicle connected to said vacuum servomotor;
    a carburetor having a throttle valve associated with said intake pipe; and means providing for enrichment of air drawn into said intake pipe from said vacuum servomotor during slip control when said throttle valve is closed.

2. The device as claimed in claim 1, wherein fuel is introduced into the intake pipe by an injection nozzle.

3. The device as claimed in claim 1, wherein a second valve is provided in an air inlet to said carburetor, and means for operating said second valve in case of brake slip control to close the inlet to the carburetor.

4. The device as claimed in claim 3, wherein the second valve is a choke valve of the carburetor.

5. The device as claimed in claim 1, wherein said means providing for enrichment of the air drawn from the vacuum servomotor is operative during slip control and when the vehicle driving wheels are decoupled from said engine.

* * * * *